United States Patent Office 3,275,075
Patented Sept. 27, 1966

3,275,075
VISCOSITY CONTROL IN PETROLEUM RECOVERY
William B. Gogarty, Littleton, and Russell W. Olson, Denver, Colo., assignors to Marathon Oil Company, Findlay, Ohio, a corporation of Ohio
No Drawing. Filed Apr. 27, 1965, Ser. No. 451,304
6 Claims. (Cl. 166—9)

This application is a continuation in part of our co-pending United States patent applications Serial No. 212,134, filed July 24, 1962, and Serial No. 324,216, filed November 18, 1963.

This invention relates to the recovery of fluid hydrocarbons and more particularly to the injection of microemulsions of predetermined viscosity into the injection wells of a subterranean formation with the subsequent displacement of oil through the formation toward production wells.

United States Patents 3,082,882 to Holm et al.; 3,126,952 to Jones and 3,163,214 to Csaszar teach the use of surfactant solutions in hydrocarbon, including substantially anhydrous soluable oils, in secondary oil recovery. Viscosity control is discussed at length in only the Holm et al. patent. In the process of this patent, viscosity control is achieved by varying the viscosity of the hydrocarbon used in making up the desired flooding solutions. Csaszar's comment on this matter is, "It has been found that the very high viscosities of soluble oils make it necessary to dilute the soluble oil with a suitable non-aqueous solvent, to reduce the viscosity thereof."

Viscosity control, however, remains a problem whenever soluble oils are utilized in recovery operations Optimally, flooding operations are carried out at a 1:1 mobility ratio between the material to be injected and the crude to be recovered.

The addition of water to anhydrous soluble oils increases the viscosity of these materials. Often the viscosity of "microemulsions" at the inversion point is in the thousands of centipoises. This phenomenon poses problems to the successful use of soluble oils in oil production. For example, if the crude in a particular formation has a viscosity of 50 cp., should a soluble oil be used which has an initial viscosity of—for example, 5 cp.—or should the soluble oil have a viscosity of about 50 cp.? The use of the low viscosity material will cause substantial fingering during the flooding process with attendant mixing of the soluble oil with the formation fluids as taught by Holm et al.

On taking up oil, the surfactant concentration of the soluble oil is reduced and, where there is water uptake, the viscosity is increased toward the desired 50 cp. Since the low viscosity soluble oil, through fingering and subsequent mixing, meets considerably more formation fluids than is met where the mobility ratio is 1:1, there is greater potential for slug breakdown and bypassing. If, however, a 50-cp. material is utilized, even a small water uptake causes soluble oil slug viscosities to rise, thereby requiring increased pumping pressure or causing the injection rate to drop substantially if formation fracture pressures are low.

We have now discovered that these problems can be ameliorated considerably through use of microemulsions of predetermined water content as a flooding medium. Soluble oils differ from microemulsions, for purposes of this invention, in that soluble oils are anhydrous or contain water as a solute while the microemulsions contain water, as a dispersed phase, in molecular aggregates. The microemulsions are substantially transparent unless contaminated by colored impurities. The benefits of water usage are obvious. In light of the previously discussed example, water can be used to raise inexpensively the viscosity of the 5-cp. soluble oil to 50 cp. with an attendant reduction in the fingering and mixing. The addition of water also reduces the sometimes tremendous difference between the viscosity of the injected soluble oil and the viscosity of the transparent emulsions at the inversion point. Thus, the pumping pressure problems attendant the use of the exemplary 50-cp. soluble oil can sometimes be avoided or greatly reduced.

Essentially, the process of this invention comprises injecting into a formation a "transparent" emulsion containing sufficient admixed aqueous diluent to impart to the injected microemulsion a predetermined viscosity; displacing the injected microemulsion toward production wells; and recovering displaced crude through recovery wells.

Many soluble oil formulations are known. Generally, these materials are anhydrous or contain small amounts of water as an impurity. Aqueous diluents can be added to many of the soluble oils known to the prior art and the microemulsions formed therefrom can be utilized in flooding without further modification. However, it is obvious that economics will generally prevent the use of microemulsions containing an insecticide, pharmaceutic, or the like. Generally, useful microemulsions are mobile and stable to the ions and fluids in the formation; i.e., they do not break readily in the presence of these materials. The microemulsions can contain additives to insure optimum operations; for example, corrosion inhibitors can be used in sour fields and bactericides can be used where necessary.

The amount of aqueous diluent to be mixed into the soluble oil is determined by a number of factors, including the viscosity of the crude in the formation, the initial viscosity of the soluble oil, the desired rate of frontal movement within the reservoir a a particular distance from the bore hole, the hydrocarbon and surfactant(s) used in making up the soluble oil, and the total tolerance of the soluble oil for water prior to inversion.

These factors affect the predetermined aqueous diluent concentration of the microemulsion in a number of ways. For example:

(1) If the viscosity of the soluble oil is only slightly less than that of the crude in the formation, little diluent need be added to the soluble oil to form a microemulsion of desired viscosity.

(2) In instances where the soluble oil will absorb only relatively small amounts of aqueous diluent prior to inversion, only small amounts of diluent can be added to the soluble oil without running the risk of inverting the microemulsion with a resulting loss and flooding efficiency.

(3) Where the frontal advance rate is to be quite high, greater amounts of diluent can be added to the soluble oil as the resulting microemulsions tend to be "pseudoplastic" in nature; i.e., their viscosity decreases as the rate of shear applied increases.

The effect of these various factors can be determined through routine testing. Thus, the amount of diluent which a particular soluble oil will emulsify prior to inversion and the resulting viscosity behavior can readily be determined by incrementally adding a particular diluent solution to a small sample of the soluble oil. The flooding efficiency of the resulting microemulsion can be readily determined by flooding consolidated sandstone cores at increasingly high flow rates to determine (1) the apparent viscosity of the microemulsion within the core and (2) the flooding efficiency of the particular microemulsion.

Preferably, microemulsions preferred for use in the process of this invention contain, by weight, from about 45 to about 60% petroleum hydrocarbon selected from a group consisting of sweet crude, straight run gasoline, and pentane; from about 20 to about 40% water (by volume); at least about 8% of an alkylaryl naphthenic monosulfonate surfactant; and from about 3 to about 4% isopropanol cosolvent.

Alcohols containing up to about 8 carbon atoms are preferred cosolvents in the microemulsions of this invention. Ethanol, isopropanol, 2-pentanol, isobutanol, cyclohexanol, cresol, and phenol are preferred alcohols. The secondary lower aliphatic alcohols, particularly isopropanol, are the most preferred alcohols for use in the composition of the banks used in the process of this invention. Other solubilizers—for example, amines and ketones—can also be used to advantage.

Surfactants which can be used include the various nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate or triethanolamine oleate.

We prefer to utilize preferentially oil-soluble anionic surfactants such as higher alkylaryl monosulfonates, particularly alkylnaphthenic monosulfonates, wherein the alkyl radical contains from about 10 to 20 carbon atoms. The sodium salts of dialkylsuccinates are also particularly desirable surfactants for use in making up the microemulsions. It is preferred that the alkyl radicals of the succinate compounds contain from about 6 to about 10 carbon atoms.

The type of microemulsion and surfactant utilized in the microemulsion depends upon the temperature of the formation and the hardness, including salinity, and pH of the connate water and the water used to make up the microemulsion. It would be futile to use a detergent such as sodium oleate in a formation containing relatively high concentrations of calcium and magnesium ions, as the precipitated calcium and magnesium soaps would plug the formation. Where there is a natural detergent in the crude, a surfactant having a similar ionic charge must be used to avoid precipitating an insoluble reaction product. Preferably, the microemulsion can emulsify large amounts of fresh water and has a low viscosity at the point where the microemulsion inverts to form a water-external emulsion.

Water is the preferred aqueous diluent and is preferably soft. However, ordinary hard tap water and even relatively brackish waters can be used with detergents which are stable to the contaminating ions. The aqueous diluent can be water containing salts included to overcome problems arising out of the water sensitivity of a particular formation. Techniques used in preparing microemulsions are known. The composition is generally prepared by dissolving the surfactant in the nonpolar constitutent. However, the surfactant can also be included in the polar constituent. Preferably, the surfactant and cosurfactant are dissolved in a petroleum fluid, and the diluent is added to the petroleum fraction incrementally with agitation.

The amount of slug used increases, though the percent of pore volume decreases, with the volume of reservoir to be swept. Thus, 2.5 to 5.0% of pore volume are adequate to flood a 40–50 acre area, while 5–10% of pore volume are necessary for a 5–10 acre area.

We prefer to inject into the formation a slug of microemulsion bank material of from 1–20% and at least about 3% to about 10% of the pore volume of the formation. Thirty percent, or more, bank material can be utilized. However, such large banks san prove economically unattractive.

It is difficult to define the exact amount of emulsion required in this process. Ideally, sufficient material should be used to provide a substantially continuous zone of micro-emulsion, at the perimeter of the area from which it is desired to recover petroleum crude, between the crude in the formation and the material used to drive the bank. Sometimes it may be more economical to use a small slug, expecting substantial breaks in the bank at the final perimeter, to obtain only a partial recovery of crude rather than to use a large slug and obtain a complete recovery in the swept area. The amount of bank required will also vary with the area to be swept. Crude viscosity, substantial variations in formation permeability, and other considerations also affect the pore volume to be used. Thus, increased amounts of bank material are required where the viscosity of the crude is high in order that the incremental drops in viscosity from the high viscosity at the leading edge to the low viscosity at the trailing edge will be small.

After injection of the bank is completed, a drive material is injected into the formation, usually through the same injection wells, to force the bank material through the formation and the crude ahead of the bank material. Water, which can contain salts in water-sensitive formations, is the preferred drive material. Other drive materials are also useful. Examples of such materials include nitrogen, carbon dioxide, and natural gas.

The following specific examples more fully illustrate our invention, but it is not intended that our invention be limited to the exact petroleum constituents, surfactants, alcohols, or procedures utilized. Rather, it is intended that all equivalents obvious to those skilled in the art be included within the scope of our invention as claimed.

EXAMPLE I

Microemulsions, as defined above, are prepared from an alkylaryl sulfonate, water, and straight run gasoline. The sulfonate, having an empirical formula approximatnig $C_nH_{2n-10}SO_3Na$, with $n=25$–$30$ and having a long paraffinic chain attached to an aromatic-napthenic nucleus, is mixed with the gasoline. The water is then dumped into the container and thereafter rapidly agitated at temperatures of about 30–34° C. Higher temperatures cause some cloudiness and high viscosities. Thus, 400 ml. of a mixture containing 7.4% sulfonate, 49.6% straight run gasoline, and 43% water require about 30 minutes to become transparent with vigorous agitation.

EXAMPLE II

Microemulsions containing the cosolvent isopropanol are prepared by first mixing the sulfonate, straight run gasoline, and isopropanol and then incrementally stirring water into the sulfonate-surfactant-cosolvent solution.

EXAMPLE III

Four floods are performed in an unconsolidated sand packed (Blackhawk E Sand) into a 10′ x 0.5″ pipe. The pack has a porosity of 37.7% and a permeability of 10 d. In each test, the sand pack is prepared in the same manner with Ilinois water. Hughes crude is injected into the sand pack as the oil phase, and air is injected as the gas phase. The various slugs are followed by fresh water at a constant injection rate of 36.7 cc./hr.

Various floods and slugs are utilized in a series of experiments set out in the table below. A slug is made up of 24% water, 3.8% isopropanol, 11.6% alkylaryl naphthenic monosulfonate manufactured by Shell Oil Company, and 60.6% straight run gasoline. The slug should have a viscosity of about 11 cp. A 40% water content, nonalcoholic microemulsion is made up of 40% water, 44% straight run gasoline, and 16% sulfonate. The microemulsion should have a viscosity of about 15 cp. An emulsion containing 60% water, 2% isopropanol, and 38% of a straight rung gasoline-alkylnaphthenic sulfonate mixture in a ratio of 84:16. The emulsion should have a viscosity of about 11 cp.

Comparable results are obtained with the nonalcoholic transparent emulsion only when the slug is tapered with a second slug of 12% pore volume of a water external, 60% emulsion containing alcohol.

*Displacement efficiencies of alcoholic and nonalcoholic systems*

| Pore Volumes to be Injected | Straight Slug 12% PV 24% H₂O (alcoholic) | Straight Slug 12% PV 40% H₂O (nonalcoholic) | Tapered Slug 12% PV 6% of 40% H₂O 6% of 60% H₂O | Tapered Slug 24% PV 12% of 40% H₂O 12% of 60% H₂O |
|---|---|---|---|---|
| Miscible Slug Secondary Oil Recovery, Percent of Original Oil in Place: | | | | |
| ½ | 34.4 | 25.8 | 27.9 | 25.0 |
| 1 | 83.6 | 69.3 | 75.4 | 81.7 |
| 1½ | 93.4 | 80.7 | 85.3 | 93.3 |
| Initial Fluid Saturations, Percent of Pore Volume: | | | | |
| Water Sat | 15.1 | 14.2 | 14.2 | 15.1 |
| Oil Sat | 57.5 | 58.4 | 57.5 | 56.6 |
| Air Sat | 27.4 | 27.4 | 28.3 | 28.3 |

EXAMPLE IV

A pentane slug containing 3.4% isopropanol, 33% water, 51.0% pentane, and 12.6% alkylnaphthenic monosulfonate can be found to yield the following results when compared with a regular water flood in a sand pack such as that of Example III. Water should be the drive material.

*Secondary oil recovery—Percent or original oil in place (with 33% water content microemulsion)*

| Pore Volumes to be Injected | 20% PV Slug Size | 12% PV Slug Size | 6% PV Slug Size | Regular Waterflood |
|---|---|---|---|---|
| ½ | 38.4 | 37.7 | 31.6 | |
| 1 | 90.0 | 90.2 | 51.7 | 57.0 |

EXAMPLE V

A pentane slug containing 1.6% isopropanol, 68% water, 24.5% pentane, and 6.1% alkylnaphthenic monosulfonate gives the following recovery efficiency when tested in the unconsolidated sand pack of Examples III and IV. Again, water is the drive material.

*Secondary oil recovery—Percent of original oil in place (with 68% water-external emulsion)*

| Pore Volumes to be Injected | 24% PV Slug Size | 12% PV Slug Size |
|---|---|---|
| ½ | 20.4 | 15.3 |
| 1 | 83.1 | 54.3 |

EXAMPLE VI

The following table sets out the average viscosity values for (1) a base soluble oil containing 5% isopropanol and 95% of a 20:80 mixture of an alkylaryl naphthenic monosulfonate and pentane and (2) the soluble oils prepared by mixing the base soluble oil with the indicated amount of water. Measurements were made on a Brookfield viscometer at the described spindle speed.

BASE SOLUBLE OIL

| R.p.m.: | Viscosity (cps.) |
|---|---|
| 6 | 0.92 |
| 12 | 0.80 |
| 30 | 0.77 |
| 60 | 0.71 |

MICROEMULSION CONTAINING 10% WATER

| R.p.m.: | Viscosity (cps.) |
|---|---|
| 6 | 3.0 |
| 12 | 3.0 |
| 30 | 2.6 |
| 60 | 2.5 |

MICROEMULSION CONTAINING 20% WATER

| R.p.m.: | Viscosity (cps.) |
|---|---|
| 6 | 5.1 |
| 12 | 4.7 |
| 30 | 4.4 |
| 60 | 4.3 |

MICROEMULSION CONTAINING 30% WATER

| R.p.m.: | Viscosity (cps.) |
|---|---|
| 6 | 9.1 |
| 12 | 8.65 |
| 30 | 8.34 |
| 60 | 8.36 |

A perusal of Example VI indicates both the fact that viscosity increases with increasing amounts of water and that for a given amount of water, the viscosity of the microemulsion decreases with increasing shear rates. Thus, as the spindle speed is increased, the apparent viscosity of the microemulsion decreases.

EXAMPLLE VII

The following tables indicate soluble oil contents, the amounts of water added thereto, and the resulting apparent viscosity when measured on a Brookfield viscometer at 30 r.p.m.

A. Soluble oil made up of 11 grams Aersol MA (dihexyl sodium sulfosuccinate), 11.4 grams of dodecanol, and 50 ml. of straight run gasoline.

| Percent Water | Shear Rate | Apparent Viscosity |
|---|---|---|
| 0 | 37.6 | 1.20 |
| 10 | 37.5 | 1.86 |
| 20 | 37.5 | 2.97 |
| 30 | 37.5 | 5.27 |

B. Soluble oil made up of 24 grams of Arquad 18–50 (an alkyl quaternary chloride), 12 grams of Triton X–35 (isooctylphenoxy diethoxyethanol), and 100 ml. of straight run gasoline.

| Percent Water | Shear Rate | Apparent Viscosity |
|---|---|---|
| 0 | 37.3 | 1.00 |
| 10 | 37.5 | 2.24 |
| 20 | 37.6 | 3.33 |
| 30 | 37.8 | 5.49 |

C. Soluble oil made up of 30 grams Arquad 2C75 (a dialkyl quaternary ammonium chloride), 7.2 grams of Triton X–100 (isooctylphenoxy diethoxyethanol), 5.4 ml. of isopropyl alcohol, and 100 ml. of straight run gasoline.

| Percent Water | Shear Rate | Apparent Viscosity |
|---|---|---|
| 0 | 37.6 | 1.55 |
| 10 | 37.4 | 4.63 |
| 20 | 37.6 | 8.54 |
| 30 | 37.7 | 12.24 |

D. Soluble oil made up of 7.5 grams of Atpet 200 (sorbitan partial fatty esters), 6.3 grams of Atlas G-3300 (salt of alkylaryl sulfonate), 6.3 ml. of ethanol, and 105 ml. of straight run gasoline.

| Percent Water | Shear Rate | Apparent Viscosity |
|---|---|---|
| 0 | 35.7 | 0.54 |
| 10 | 37.4 | 1.19 |
| 20 | 37.7 | 2.65 |
| 30 | 37.6 | 3.45 |

Now having described our invention, what we claim is:

1. The process comprising adding to a soluble oil a predetermined amount of aqueous diluent sufficient to form a microemulsion of predetermined viscosity, injecting said microemulsion into a subterranean oil-bearing formation through at least one injection well drilled into said formation, displacing said microemulsion and crude petroleum in said formation toward at least one production well drilled into said formation, and recovering crude petroleum through said production well.

2. The process comprising adding to a soluble oil having a viscosity substantially less than that of the crude in the subterranean oil-bearing formation to be flooded a predetermined amount of aqueous diluent sufficient to form a microemulsion having a viscosity at least about that of the crude in said formation, injecting said microemulsion into said formation through at least one injection well drilled into said formation, displacing said microemulsion and crude petroleum within said formation toward at least one production well drilled into said formation, and recovering crude petroleum through said at least one production well drilled into said formation.

3. The process of claim 2 wherein the aqueous diluent is water.

4. The process of claim 2 wherein the volume of microemulsion injected into said formation comprises from about 1 to about 20% of the pore volume of the formation being flooded.

5. The process of claim 2 wherein the volume of microemulsion injected into said formation comprises from about 3 to about 10% of the pore volume of the formation being flooded.

6. The process of claim 2 wherein the mircoemulsion is made up of a hydrocarbon, water, an alkylarylnapthenic monosulfonate surfactant, and a cosurfactant.

References Cited by the Examiner

UNITED STATES PATENTS 3,149,669  9/1964  Binder et al. _____ 166—9
3,163,214  12/1964  Csaszar _____ 166—9

CHARLES E. O'CONNELL, *Primary Examiner.*

T. A. ZALENSKI, *Assistant Examiner.*